United States Patent [19]

Speca et al.

[11] Patent Number: 4,472,531

[45] Date of Patent: Sep. 18, 1984

[54] POLYMERIZATION CATALYST AND METHOD OF PREPARING THE SAME

[75] Inventors: Anthony N. Speca, Cincinnati; Louis J. Rekers, Wyoming, both of Ohio

[73] Assignee: National Petro Chemicals Corporation, New York, N.Y.

[21] Appl. No.: 279,872

[22] Filed: Jul. 2, 1981

Related U.S. Application Data

[63] Continuation of Ser. No. 111,744, Jan. 14, 1980, abandoned.

[51] Int. Cl.$^3$ .......................... B01J 23/26; B01J 21/08
[52] U.S. Cl. ...................................... 502/256; 502/237
[58] Field of Search ................ 252/451, 458; 423/328; 502/256, 233, 237

[56] References Cited

U.S. PATENT DOCUMENTS

| | | | |
|---|---|---|---|
| 3,652,215 | 3/1972 | Aboutboul et al. | 423/328 |
| 3,867,306 | 2/1975 | Witt et al. | 252/458 X |
| 4,037,042 | 9/1977 | Mueller-Tamm et al. | 423/328 X |
| 4,246,139 | 1/1981 | Witt | 252/451 |
| 4,299,731 | 11/1981 | McDaniel et al. | 252/451 |

*Primary Examiner*—Carl F. Dees
*Attorney, Agent, or Firm*—Kenneth D. Tremain

[57] ABSTRACT

An olefin polymerization catalyst comprising a silica xerogel support having a pore volume greater than about 2.0 cc/g, the major portion of which volume is provided by pores having pore diameters ranging from 300 to 600 Å and a surface area ranging from 200 to 500 m$^2$/g, and having deposited thereon a metal-containing catalytic material, such as chromium oxide, or other metal oxide. A suitable hydrogel is treated with a water miscible organic liquid to substantially displace the aqueous phase and the resultant organogel with or without intermediate drying is then impregnated by a concentrated aqueous solution of a metal salt decomposable to the oxide on subsequent calcination. Also disclosed is a polymerization process utilizing such a catalyst for the preparation of polymers and copolymers of 1-olefins having a maximum of 8 carbon atoms in the chain and having no branching nearer the double bond than the 4-position, e.g., ethylene polymers.

11 Claims, No Drawings

POLYMERIZATION CATALYST AND METHOD OF PREPARING THE SAME

This is a continuation of applicaton Ser. No. 111,744, filed Jan. 14, 1980, now abandoned.

BACKGROUND OF THE INVENTION

1. Field of the Invention

This invention relates to a catalyst useful in a process for the polymerization of 1-olefins having a maximum of 8 carbon atoms in the chain and having no branching nearer the double bond than the 4-position. The catalyst is formed on a silica xerogel support having a cummulative pore volume, pore diameter distribution, and surface area such that relatively low molecular weight, high melt index polyolefins are readily produced in particle form polymerization carried out therewith.

2. The Prior Art

Silica gels find numerous applications, chief amongst which are as adsorbents and catalyst supports. The latter application in particular has attracted increasing attention in recent years, especially in connection with catalysts for the stereospecific polymerization of olefins. Catalysts having sterospecific activity include metal-containing catalytic materials, e.g. chromium supports which have previously been activated by oxidation at elevated temperatures. Olefins may be polymerized with with such catalysts to produce a varied series of polymers having differing molecular weights and melt indexes, depending upon the particular temperatures, pressures, solvents or other diluents, catalysts or other reaction conditions used.

For many applications the production of low molecular weight, high melt index polymers is of particular advantage, such materials finding important applications in films and sheets, extrusion coating, injection and rotational molding, the like. Considering the preparation of ethylene polymers as illustrative, low molecular weight (high melt index) polyethylenes are commercially obtained by carrying out the polymerization in solution (the "solution process"), but only at relatively low conversion, measured as pounds of polymer per pound of catalyst. When the reaction is carried out in suspension (the "suspension" or "particle form" process), it is possible to obtain higher conversions. The particle form process thus exhibits distinct commercial advantages relative to the solution process for the stereospecific polymerization of olefins. However, particle form slurry operations have been limited, at high conversion rates, to the production of polyolefins having melt indexes lower than about 2. Various techniques have been proposed to increase the melt indexes of olefin polymers so produced, with varying degrees of success. For example, while the use of modifiers such as hydrogen has been found to decrease the molecular weight and increase the melt index of the polymer product, the advantages attendant the use of such materials are limited since they simultaneously decrease catalyst activity. Similarly, variation of the chromium oxide content of the catalyst, addition of different metal oxide promoters, combination of different supports and/or the use of varying catalyst activation temperatures, have been widely investigated, with only marginal improvement.

Modification of the porosity, surface area and other characteristics of the catalyst support has also been suggested as a means for increasing the melt index of olefin polymers produced by particle form stereospecific polymerization reactions. Thus, in recent years a number of procedures have been described in the literature for the preparation of silica gel materials said to be useful as catalyst supports for this purpose. Such procedures are described, for example, in U.S. Pat. Nos. 3,132,125 and 3,225,023; and in British Pat. Nos. 1,007,722. Silica gels so prepared have not, however, achieved their intended purpose, i.e., the production of olefin polymers having markedly increased melt indexes.

Thus, for example Schwander et al U.S. Pat. No. 3,132,125 describes the use in both solution and suspension processes of stereospecific catalysts supported on non-porous silicas for the production of polyolefins said to have relatively low average molecular weights and, correspondingly, high melt indexes. Relatively high melt index polymers were in fact produced in the solution phase operations exemplified by Schwander et al. Where, however, particle form operations were utilized use of the catalyst described in this patent resulted in the preparation of polymer products having melt indexes (estimated from the molecular weight data set forth by Schwander et al) no greater than about 0.2.

Hogan et al U.S. Pat. No. 3,225,023, assigned to Phillips Petroleum Company, suggests that olefin polymers having increased melt indexes may be produced employing catalyst supports having increased average pore diameters, ranging from about 60 to 400 A. Hogan et al illustrate their process by experimental runs (which may have been been conducted in either the solution or suspension phases), employing "commercial silica gel" supports having varying average pore diameters. The use of silica gels of the type commercially available as of the Hogan et al. filing date (November, 1962) and having the indicated range of average pore diameters has not, however, resulted in the formation of very high melt index polymers employing particle form operations. Thus, polyethylene so produced (employing chromium oxide catalysts deposited on such supports) have melt indexes of only up to about 3.0.

British Pat. No. 1,007,722, also assigned to Phillips Petroleum Company, describes the use of a "specific form of high purity finely divided porous silica gel" as a support for a chromium oxide catalyst said to be capable of producing relatively high melt index polyethylene in a particle form polymerization. The specific form of silica gel referred to in the British specification is a silica aerogel having a pore diameter between approximately 200 A and 500 A, a surface area of approximately 250 to 350 m$^2$/g, a density of less than approximately 0.2 g/ml, and an oil adsorption of approximately 300 lbs/100 lbs. "Syloid" 244 (having a surface diameter of 350 A is the sole such material exemplified.

Aerogels are silica gels in wich the liquid phase has been replaced by a gaseous phase in such a way as to avoid shrinkage as occurs by direct evaporation of the liquid phase thereof (materials prepared in the latter manner being termed xerogels); Iler, The Colloid Chemistry of Silica and Silicates, Cornell University Press, pages 137 and 152. Aerogels are, however, subject to subsequent strinkage when wetted due to coalescence of their ultimate particles. Shrinkage of this nature decreases porosity and markedly impairs the use of these materials as sterospecific catalyst supports. Moreover, aerogels readily disintegrate when subjected to mechanical stress. Thus, it has been found that the use of silica aerogels as catalyst supports in the particle form process is less than satisfactory.

Nor have other recently disclosed silica gel materials having varying porosity and surface area characteristics proved adequate to effect the production of high melt index olefin polymers in particle form operations. Such materials are disclosed, for example, in U.S. Pat. Nos. 2,731,326; 3,403,109; 3,428,425; and 3,669,624; and in British Patent No. 1,077,908.

As illustrative, Hyde U.S. Pat. No. 3,453,077, and British Patent No. 1,077,908, both of which are assigned to W. R. Grace and Co., disclose methods said to result in the preparation of "microspheroidal silica gels" having pore volumes within the range of from as low as 0.3 cc/g (the British specification) to as much as 2.5 cc/g (the U.S. patent), and surface areas within the range of from 100 to 800 m$^2$/g. These references describe procedures for the preparation of silica gels involving gelling alkali metal silicate solutions with gaseous carbon dioxide or mineral acids, neutralizing either about half (the British specification) or substantially the entire alkali metal silicate content of the hydrogels thus formed, aging the neutralized gels (and, in the case of the U.S. patent, making the gel pH alkaline with ammonium hydroxide), thereafter spray-drying the hydrogel to remove the liquid phase, washing the spray-dried material and re-drying the same for subsequent use. It has, however, been found that these procedures do not enable one to prepare silica gel materials having cumulative pore volumes as large as 2.0 cc/g. Moreover, when silica gels thus made are used as supports for stereospecific catalysts in the particle form polymerization of ethylene, polyethylenes having melt indexes of only up to about 2 are obtained.

A major advance in this art was the discovery of techniques for manufacture of silica xerogels having uniquely advantageous physical properties to serve as support for metals as olefin polymerization catalysts. That catalyst is a silica xerogel support having a metal-containing catalytic material deposited thereon. The silica xerogel has a pore volume greater than 1.96 cc/g, e.g., greater than about 2.0 cc/g, the major portion of which pore volume is provided by pores having average pore diameters within the range of from about 300 to 600 A; and a surface area within the range of from about 200 to 500 m$^2$/g. The pore volume of the xerogel is suitably provided by pores having a narrow pore diameter distribution primarily within the indicated 300 to 600 A range. The metal-containing catalytic material deposited on the support is preferably a metal oxide, especially chromium oxide or another metal oxide such as cobalt, nickel, vanadium, molybdenum or tungsten oxides. It has been found that a stereospecific catalyst comprising the specified silica xerogel support having the indicated cumulative pore volume, average pore diameter and surface area characteristics is quite effective in particle form olefin polymerizations in producing olefin polymers having markedly higher melt indexes than heretofore obtained.

The polymerization process in which such catalyst is useful involves contacting a 1-olefin having a maximum of 8 carbon atoms in the chain and no branching nearer the double bond than the 4-position (preferably ethylene) with the catalyst under polymerization conditions to provide the indicated high melt index, low molecular weight polyolefin products.

For example, employing that new catalyst, polyethylenes may be readily produced with melt indexes in excess of 2.0, and up to about 15.

Preferably, the silica xerogels employed in the catalyst have cumulative pore volumes ranging from about 2.0 to 2.5 cc/g, with about 70% or more of the pore volume being provided by pores having an average pore diameter within the approximate 300 to 600 A range. Use of such materials as supports for chromium oxide-containing catalysts, for example, results in the formation of polyethylenes having particularly advantageous, high melt indexes ranging from about 3 to 12.5.

The silica xerogel supports of the catalyst, and particularly the porosity and surface area characteristics thereof, are described in terms of their pore volumes (PV), surface areas (SA), and average pore diameters (PD). The surface area is determined by the standard BET method described to Brunauer, Emmett and Teller, J.Am. Chem. Soc., 60, 309 (1938). The pore volume is determined by the well known nitrogen adsorption-desorption technique described, for example, in Catalysis, Vol. II, pages 111–116, Emmett, P. H., Reinhold Publishing Corp., New York, N.Y., 1955 (Run to a P/Po of 0.967 which is equivalent to 600 A, pore diameter) and elsewhere. The pore volumes referred to herein refer to the gel volumes determined by permitting nitrogen gas to be adsorbed by and condensed in the pores of the gel at the normal boiling point of liquid nitrogen and at some relative pressure P/Po, wherein P is the pressure of the nitrogen vapor over the gel and Po is the vapor pressure of liquid nitrogen. For silica gels, the determination of this nitrogen pore volume at a relative pressure P/Po=0.967 permits computation of the volume of those pores having diameters of up to 600 A, which principally contribute to the gel surface phenomena. The average pore diameter may be calculated from this data as follows:

$$PD(A) = \frac{4PV \text{ (cc/g)}}{SA \text{ (m}^2\text{/g)}} \times 10^4$$

It should further be understood that, as used herein, "pore volume" and "cummulative pore volume" are synonymous, and refer to the total volume of the pores which comprise the xerogel structure per unit weight thereof. Similarly, the terms average or mean "pore diameter" or "pore size" are used interchangeably herein, and refer to a one-point representation of an actual distribution calculated by the above formula which is based on the geometric model of a right circular cylinder.

The silica xerogels employed in the new supported catalyst are prepared in accordance with the methods disclosed in U.S. Pat. Nos. 3,652,214; 3,652,215; 3,652,216; 3,794,712; 3,794,713; and 3,801,705. The methods described in the noted prior disclosures (which are incorporated herein by this reference) involve the following steps for preparation of silica xerogel;

1. Precipitating a silica hydrogel, under conditions of good-solution, by neutralizing an aqueous alkaline silicon solution, e.g. with a strong acid, a weak acid such as $CO_2$, an ion exchange resin, or by other suitable means to produce a silica hydrogel slurry, employing the following conditions:

a. the neutralizing medium is added to the aqueous alkaline silicate solution at a rate such that the gel point of the solution is reached in from about 30–120 minutes, e.g. at a rate of up to 40% of the needed amount in 30–120 minutes and the remaining 60% in from about 20–90 minutes more, b. the temperature during precipitation is maintained between about 0° and 17° C., c. the $SiO_2$ concentration in the final slurry is between about 5 and 12% by weight, and d. the final pH of the hydrogel slurry is from pH 3–8;

2. Maintaining the hydrogel slurry at a pH within the range of pH 3–8 at a temperature and for a time sufficient to strengthen the hydrogel structure;

3. Reducing the concentration of the alkaline material in the hydrogel by washing the same with a liquid which displaces the alkaline material, until the wash liquor recovered contains less than about 20 ppm of the alkaline material, expressed as salt thereof; and 4. Drying the resulting product, either by vacuum freeze-drying (specifically as described in the aforesaid U.S. Pat. No. 3,652,214), solvent displacement (specifically as described in the aforesaid U.S. Pat. No. 3,652,215), or aqeotropic distillation (specifically as described in the aforesaid U.S. Pat. No. 3,652,126). See also U.S. Pat. No. 4,053,565.

The metal-containing catalyst material can be deposited on the silica xerogel support thus formed in any suitable manner. For example, the silica xerogel base can be coated with a metal oxide by shear mixing the finely ground metal oxide with the silica base at room temperature. When chromium oxide is selected as the metal-containing catalyst, 0.5% to 5% by weight and preferably from 1% to 3% by weight based on the total weight of the supported catalyst, may be deposited on the xerogel support. Similar results can be obtained by blending the metal oxide and the carrier under vacuum conditions and/or under a nitrogen atmosphere at 200° C. Activation of the catalyst is carried out in dry air in a fluidized bed at a temperature between about 1500° and 2000° F., and preferably at about 1825° F. The period set for activation is on the order of from 2 to 10 hours and preferably about 6 hours at the foregoing temperatures conditions. The activation is accomplished without any physical change in the carrier.

The effect of these preparational steps is to set the silica gel structure at a desired relationship while in the hydrogel state and thereafter removing the liquid phase of the gel to form the xerogel under conditions to avoid shrinkage by the effect of water. If the hydrogel be dried by simple evaporation, shrinkage occurs, probably by the effect of the water meniscus retreating in the pore. After removal of the liquid phase by techniques described in the patents cited above, the resultant xerogel is impaired as to catalytic properties upon contact with water. The xerogel must be protected against contact with liquid water or moisture content of gaseous media with which it is contacted. For example, the high temperature activation is conducted in a fluidized bed with air which has been very thoroughly dried. This has precluded the use of aqueous solutions for impregnation of the xerogel with a decomposable compound of the metal to be applied. Instead, the water free methods described above are normally employed.

One method of impregnation in the absence of water is described in U.S. Pat. No. 2,734,874. That patent notes the disadvantages of using aqueous solutions and proposes instead a solution of a metal acetylacetonate in an organic solvent. That method uses expensive materials to achieve effective impregnation of a xerogel in the absence of water.

SUMMARY OF THE INVENTION

By a modification of the technique described in commonly assigned U.S. Pat. No. 3,652,215, metal salts in solutions which contain significant amounts of water, i.e. aqueous media, may be used to impregnate the organogel before or after the same is converted to the corresponding xerogel. That patent to Aboutboul et al. (hereafter "the Aboutboul patent") is directed to the method characteirzed by washing the hydrogel with a water miscible organic liquid until the liquid phase of the gel is substantially constituted by the organic liquid (organogel) as detected by low concentration of water, say less than 1%, in the organic wash liquid. The mechanism is essentially replacement of water by a liquid miscible with water.

A preferred liquid in the Aboutboul patent and in utilization of the present invention is acetone which typifies the water miscible organic liquids and is readily available at reasonable cost. The aqueous phase of a suitable silica hydrogel is thus replaced by a liquid such as acetone, an aqueous solution of a suitable salt decomposable to the oxide is then applied to the gel containing organic liquid and the impregnated organogel is dried and activated at high temperature resulting in decomposition of the salt to the metal oxide without impairing the physical properties of the xerogel and resulting in a highly active, efficient catalyst.

DESCRIPTION OF THE SPECIFIC EMBODIMENTS

The invention is well illustrated by the preparation of silica xerogel impregnated by chromium nitrate nonahydrate, $Cr(NO_3)_3 \cdot 9H_2O$. The effect of different variables in that operation are exemplary of the factors needing attention in order to obtain best results with a variety of gels and metals.

The salt chosen is generally a water soluble compound of the desired metal, which compound decomposes on heating to the metal oxide. Preferred salts are nitrates because of availability and the fact that the nitrate anion decomposes on heating to leave the metal oxide without troublesome by-products. Other anions known to the art as forming water soluble, heat decomposable salts of metal may be employed, for example the acetates are suited to the present purpose.

The metal chosen will depend on the type of catalytic activity desired. Hexavalent chromium is preferred for polymerization of 1-olefins. For other reactions, the invention may be applied in preparation of supported oxides or sulfides of nickel, thorium, manganese, vanadium, uranium, tungsten, molybdenum, cerium, platinum and the like. In addition to the decomposable salts, these may be applied as other heat decomposable compounds such as the heteropoly acids, e.g. molybdotungstic acid. Also usable are ammine salts such as platinum ammine chloride or compounds related to chloroplatinic acid.

In addition to silica gel, other porous refractory oxides are amenable to the treatment. Included are alumina, zirconia, thoria and related metal oxides which can be prepared as porous gels as well as the binary gels typified by silica-alumina and silica-zirconia and ternary gels such as silica-alumina-thoria. The methods for making the hydrogels of these oxides are amply discussed in the scientific literature together with techniques for modification of final properties of the resultant xerogel after preparation is complete. Pore size, pore volume, surface area, hardness and other properties have been shown to be affected by history of the hydrogel with respect to such parameters as time, temperature, acidity (pH), manner of dehydration, etc. The preferred gels used in the present invention are the silica gels prepared by the method of the Aboutboul patent in provision of polymerization catalysts.

The aqueous solutions of metal compounds used herein are preferably highly concentrated to introduce a maximum amount of decomposable metal compound and minimum amount of water. Particularly preferred are saturated solutions of highly soluble compounds. The invention is predicated on a finding that the Aboutboul organogels can tolerate a small amount of water added with the metal compound but it is believed that best results are obtained by holding the amount of water so added at the practicable maximum consistent with solution of the desired amount of metal. Solvent for the metal compound is referred to as "aqueous" in the sanse that it is characterized by a significant amount of water, say at least 5% by weight. The solvent for the metal compound may also contain other constituents. For example, a portion of the solvent may be constituted by the same water miscible liquid which has displaced the water of the original hydrogel.

Referring now specifically to preparation of a polymerization catalyst of hexavalent chromium on silica by impregnation of gel in which the liquid phase is acetone, a concentrated solution of chromium nitrate in water or acetone/water mixture is applied to the gel.

When the chromium nitrate nonahydrate is added slowly to acetone with stirring, a small initial quantity will dissolve. In one experiment about 4 grams of the salt were added to 16.7 grams of acetone, whereupon the solution thickened and a light blue flocculent precipitate formed. More acetone does not dissolve the precipitate, but it does dissolve on adding water in an amount substantially greater than is required when following preferred procedures of wetting the salt with a small amount of water and adding acetone or adding an acetone-water mixture to the salt with stirring. Alternatively the salt is dissolved in a minimum amount of water, possibly with heating and the solution in water is added to the acetone filled gel which is preferably slurried in acetone.

When acetone-water mixtures are used as solvent for the salt, avoidance of precipitate appears to depend on an inter-relationship of weight percent of water in the solvent, ratio of solvent to salt and speed of addition. It was found that rapid addition of solvent to the salt required a minimum of 6 weight percent water in the solvent and a minimum of 2 grams of solvent per gram of salt to prevent precipitation of the light blue solid. Once that precipitate forms, it can be redissolved only by addition of an amount of water greater than that needed to prevent precipitation.

Solutions so prepared are added to acetone slurries of silica gel prepared in the manner described by the Aboutboul patent. The silica gel may be dried before slurrying in acetone but is preferably subjected to coating with chromium while the pores are filled with the acetone which replaced the original water of the hydrogel. Only a portion of the chromium salt is sorbed into the pores while the gel is in the slurry with acetone. Upon evaporation of the acetone, the salt is completely sorbed in the gel. Upon activation by heating in the absence of moisture and in presence of oxygen, the chromium salt is decomposed, the metal is converted in large part to the hexavalent form and the catalyst is ready for use in promoting polymerization of 1-olefins. The heat activation is advantageously carried out in a fluidized bed with substantially anhydrous air at temperatures upwards of about 1500° F. but below temperatures which damage the catalyst, usually not above about 1800° F.

In general, no advantage has been found for using a solvent mixture of acetone and water. High hexavalent chromium contents and high polymerization activity are found with mixed solvent and with water alone as solvent. Likewise, no advantage is obtained by drying the gel before impregnation of a slurry of the gel in a water miscible liquid. The invention provides a means for preserving integrity of gel physical properties while impregnating with a water soluble metal compound and drying. In what are regarded as the most efficient embodiments, the invention contempates replacing the hydrogel liquid phase (water) with a water miscible organic liquid and adding a concentrated water solution of a decomposable metal compound to a slurry of the resultant organogel in the water miscible liquid.

EXAMPLE 1

A silica gel prepared by the method of the Aboutboul patent which contained about 7 wt % acetone was impregnated with chromic nitrate nonahydrate. Thirty-six grams of the gel were slurried with 200 grams of acetone. A solution of 3.05 grams of the chromium salt in 3.0 grams of water was added dropwise over a period of one minute to the stirred slurry. Stirring was continued for fifteen minutes and the slurry was permitted to settle. The supernatant liquid was light blue in color, indicating that only a portion of the chromium salt had been adsorbed. The entire mass was transferred to a 1000 ml. flask and evaporated under vacuum at 50 torr and 50° C. to yield a free flowing blue powder containing 1.1% chromium.

EXAMPLE 2

The procedure of Example 1 was repeated with 1.75 grams of the chromium salt in 2.0 grams of water being added to 38 grams of the gel slurried in 205 grams of acetone. Volatiles were removed under vacuum as in Example 1 to yield a free flowing light blue powder containing 0.6% chromium.

EXAMPLE 3

A larger batch of catalyst was prepared from 256.5 grams of the same silica gel slurried in 975 grams of acetone by adding a solution of 11.8 grams of chromic nitrate nonahydrate in 6.4 grams of water. The dark blue solution was added over a period of two minutes with rapid stirring. The mixture was stirred for an additional fifteen minutes whereupon volatiles were removed under vacuum to 50 torr and 50° C. The product was of a free flowing light blue powder containing 0.6% chromium.

It is to be noted that water added to the system includes not only 6.4 grams used to dissolve the salt but also 4.8 grams of water of hydration in the nonahydrate salt. It will be seen that the water added amounts to 4.2% of the total weight of gel plus water.

EXAMPLE 4

In order to reduce the amount of water introduced during impregnation, a solution was prepared of chromic nitrate nonahydrate in acetone-water mixture containing 6 wt % water. The acetone water mixture, 22.24 grams, was added with stirring to 11.12 grams of the salt. That solution was added dropwise over a period of ten minutes to a slurry of 240.87 grams of the same silica gel in 965 grams of acetone with stirring. The amount of salt added is calculated to provide 0.6% chromium on the gel. After 15 minutes of additional stirring, the gel was permitted to settle and a 5 ml sample of the liquid was examined. Following an additional hour of stirring, a further 5 ml sample was drawn for examination. It was found that not all of the chromium was absorbed onto the gel and that slow absorption over a period of time was not significant. The slurry was then vacuum dried to 50 torr and 50° C. to provide the product.

EXAMPLE 5

Effects of different variables in using acetone-water mixtures are illustrated by preparations conducted to provide a catalyst of 1.0% chromium on silica xerogel with minimum amounts of water. As previously noted, acetone alone is a poor solvent for chromium nitrate monohydrate, probably because it induces dehydration of the salt to an insoluble lower hydrate. On slow addition of the salt with stirring to 16.7 grams of acetone, an initial quantity of salt was dissolved. When the amount of salt added reached about 4 grams, the solution thickened and a light blue flocculent precipitate formed. Addition of more acetone did not dissolve the precipitate, but it did dissolve upon addition of several grams of water, an amount greater than would have been required for an effective acetone-water solvent. For rapid addition of acetone-water solvent to chromium nitrate nonahydrate, it appears that 6% water by weight is a practicable minimum and that about two grams of solvent per gram of salt must be added.

EXAMPLE 6

An amount of the gel used in Example 1 weighing 247 grams was slurried with 988 grams of acetone for impregnation with 1.0% chromium, requiring 19 grams of chromic nitrate monohydrate. Based on the above generalization, the solvent should be 38 grams of 6% water—94% acetone. That solvent was prepared from 2.3 grams of water and 35.7 grams of acetone. Addition of the salt to the solvent mixture produced the light blue precipitate. Precipitation again occurred when the solvent was added to the salt. Appearance of this latter precipitate indicates that the amount of salt to be dissolved may be a significant variable since no precipitate was formed in Example 4 with 11.12 grams of salt. A satisfactory solution was formed by adding the water, 2.3 grams, to the 19 grams of salt followed by 35.7 grams of acetone added at a slow rate (about 30 seconds). The deep blue solution was added to the gel slurry and worked up as in previous examples to yield a free flowing light blue powder containing 1.0% chromium on silica gel.

EXAMPLE 7

The first of two batches for evaluation in a polymerization pilot plant was prepared by slurrying 275 grams of the same gel described in Example 1 in 1100 grams of acetone under rapid stirring. Into a 150 ml beaker equipped with a magnetic stirrer, 12.7 grams of the chromium salt $Cr(NO_3)_3 \cdot 9H_2O$ was weighed in and 1.5 grams water was added by a dropper. Stirring was started and the salt was thoroughly moistened with the water. Since dissolution is a negative energy process the beaker was heated slightly. Acetone was then added portionwise with stirring in the amount of 23.9 grams over a 10 minute period. This method of addition and quantity of constituents prevents formation of a light blue precipitate which is probably a lower hydrate. The dark blue solution was loaded into a pressure equalizing funnel and the beaker was washed down with acetone. The quantity of liquid from washing down the beaker was added to the funnel after all the concentrated solution was completely added to the gel slurry dropwise over a period of 15 minutes under rapid stirring. The acetone wash was then added. After 15 minutes additional stirring the slurry was dried under vacuum to 50° C. and about 50 torr. The product was 0.6% chromium on silica gel.

EXAMPLE 8

Example 7 was repeated to provide a further quantity of the same catalyst.

EXAMPLE 9

Catalyst was prepared from acetone wet silica gel prepared according to the Aboutboul patent slurried in acetone. The impregnant was chromic nitrate nonahydrate dissolved in 0.6 grams of water per gram of salt.

EXAMPLE 10

For comparison purposes, a portion of catalyst was prepared by impregnation with chromium acetylacetonate dissolved in dichloromethane. Three hundred grams of silica gel was slurried with 2720 grams of dichloromethane and impregnated by dropwise addition of 12.09 grams chromic acetylacetonate in 100 grams of dichloromethane. The product was dried in the manner described above.

Catalysts prepared in the manner above described were heat activated by fluidizing with dried air at 3.6 meters per minute linear velocity while being heated in steps to a temperature of 938° C. (1720° F.). After six hours at this temperature the catalyst was permitted to cool under nitrogen and recovered as a free flowing powder. Properties of typical catalysts according to the invention are compared with a commercially used catalyst before activation ("Unact.:") and after activation (Act.) in Table I.

TABLE I

| | PROPERTIES OF CHROMIUM CATALYSTS | | | | | | | | |
|---|---|---|---|---|---|---|---|---|---|
| Example | (1) % $H_2O$ added | K.F. % $H_2O$ (2) Unact. | Pore Vol (3) Unact. | Act. | % Cr(6+) Unact. | Act. | % Total Cr Unact. | Act. | Ratio Cr(6+)/Cr |
| 2 | 2.7 | 2.4 | 2.60 | 2.47 | — | 0.52 | — | — | — |
| 3 | 4.2 | 2.6 | 2.53 | 2.55 | — | 0.60 | 0.68 | 0.71 | 0.84 |
| 4 | 2.4 | 2.79 | 2.1 | 2.39 | — | 0.65 | 0.66 | 0.75 | 0.88 |
| 6 | 4.0 | 3.29 | 2.33 | 2.45 | — | 0.78 | 0.99 | 1.06 | 0.74 |
| 7 | 2.3 | — | — | 2.51 | — | 0.57 | — | 0.70 | 0.82 |
| 8 | 2.3 | — | — | 2.58 | — | 0.63 | — | 0.75 | 0.84 |

TABLE I-continued

PROPERTIES OF CHROMIUM CATALYSTS

| Example | (1) % $H_2O$ added | K.F. % $H_2O$ (2) Unact. | Pore Vol (3) Unact. | Pore Vol (3) Act. | % Cr(6+) Unact. | % Cr(6+) Act. | % Total Cr Unact. | % Total Cr Act. | Ratio Cr(6+)/Cr |
|---|---|---|---|---|---|---|---|---|---|
| 9 | 4.3 | 2.68 | 2.54 | 2.57 | — | 0.60 | 0.61 | 0.71 | 0.85 |
| 10 | 0.0 | 1.22 | 2.78 | 2.72 | — | 0.61 | 0.63 | 0.68 | 0.90 |

(1) $H_2O$ used to dissolve $Cr^{+3}$ salt plus $H_2O$ hydration expressed as % of support plus salt.
(2) % $H_2O$ on coated gel after acetone removal and prior to activation, by Karl Fischer analysis.
(3) By water method, see Innes, Analytical Chemistry 28, 332-4 (1956).

Pilot Plant Evaluation

The new catalysts were evaluated in a pilot plant under standard conditions. The chromic nitrate catalyst was prepared as described in Example 9. To a continuous polymerization reactor was added isobutane (diluent), ethylene, hydrogen and the supported catalyst. The temperature was held at 107° C. (225° F.) and the total pressure at 650 psig. The data are presented in Table II. It is evident that the productivities of both catalysts from examples 9 and 10 were better than the standard commercial catalyst. The homopolymer densities are essentially equivalent as are the melt indices in view of the different productivities. See Table II.

TABLE II

Pilot Plant Data Summary

| Run No., | 1 | 2 | 3 |
|---|---|---|---|
| Temperature | 107° C. (225° F.) | 107° C.(225° F.) | 107° C. (225° F.) |
| Catalyst Type | Commercial | $Cr(NO_3)_3.9H_2O$ | $Cr(acac)_3$ |
| Cr Content | 0.9% | 0.6% | 0.6% |
| Ethylene (mole %) | 6.9 | 5.2 | 5.1 |
| Hydrogen (mole %) | 2.6 | 2.5 | 2.6 |
| $H_2/C_2=$ Ratio | 0.37 | 0.48 | 0.50 |
| Productivity | | | |
| lb PE/lb cat | 1299 | 1931 | 2262 |
| lb PE/lb cat/mole % $C_2=$ | 188 | 371 | 443 |
| lb PE/lb CR/mole % $C_2=$ | 20,889 | 61,833 | 73,833 |
| $MI_2$ Powder | 5.48 | 5.45 | 5.98 |
| $MI_2$ Pellet | 5.32 | 5.48 | 5.36 |
| Annealed Density | 0.9655 | 0.9667 | 0.9652 |
| Tap Density, lb/ft³ | 33.0 | 33.8 | 33.4 |

Bench Scale Evaluation

The new catalysts were evaluated in bench scale reactors using triethylborane as a modifier. The data and reactor conditions are listed in Table III.

TABLE III

Bench Scale Data for Cr(3+) Catalysts

| Chromium Compound | Productivity g PE/g cat hr | Productivity g PE/g Cr hr | $H_2$ psig | Resin Powder Properties MI | Resin Powder Properties HLMI | HLMI/ MI |
|---|---|---|---|---|---|---|
| $Cr(NO_3)_3.9H_2O$ | 736 | 122,667 | 30 | 0.40 | 33.6 | 84 |
| | 729 | 121,500 | 30 | 0.49 | 39.9 | 81 |
| | 772 | 128,667 | 30 | 0.36 | 33.9 | 94 |
| | 784 | 130,667 | 30 | 0.47 | 36.6 | 78 |
| | 628 | 104,667 | 120 | 2.1 | 100 | 47 |
| | 553 | 92,167 | 120 | 2.0 | 108 | 54 |
| | 566 | 94,333 | 120 | 3.0 | 146 | 49 |
| | 414 | 69,000 | 120 | 2.8 | 123 | 44 |
| $Cr(acac)_3$ | 1014 | 169,000 | 30 | 0.85 | 63.3 | 63 |
| | 699 | 116,500 | 30 | 0.69 | 47.3 | 68 |
| | 774 | 129,000 | 30 | 0.95 | 54.4 | 57 |
| | 821 | 136,833 | 30 | 0.82 | 62.8 | 76 |
| | 209 | 34,833 | 120 | 0.65 | 39.5 | 61 |
| | 685 | 114,167 | 120 | 1.39 | 88 | 63 |
| | 782 | 130,333 | 120 | 1.51 | 85 | 56 |
| | 824 | 137,333 | 120 | 1.40 | 90 | 64 |

Bench Scale Conditions
Diluent: Isobutane
Temperature: 99° C.(210° F.)
Hydrogen: psig as indicated TABLE III-continued Bench Scale Data for Cr(3+) Catalysts Ethylene: 10 mole %
Modifier: triethylborane (approximately 3 moles B/1 mole Cr)

We claim:

1. A process for preparing a catalyst of a chromium oxide supported on a silica of high pore volume which comprises forming a hydrogel of said silica, replacing the aqueous phase of said hydrogel by a water miscible organic liquid to form an organosilica gel, suspending said organosilica gel as a slurry in a water miscible organic liquid, adding to said slurry an aqueous solution of chromic nitrate nonahydrate, evaporating liquid from said slurry, and heating to decompose said chromic nitrate nonahydrate.

2. A process according to claim 1 wherein said water miscible organic liquids are acetone.

3. A process according to claim 1 wherein the solvent of said aqueous solution is constituted by a major proportion of a water miscible organic liquid and at least 6% of water.

4. A process according to claim 3 wherein the organic liquid of said solvent is acetone.

5. A process for preparing a catalyst of a chromium oxide supported on a silica of high pore volume which comprises forming a xerogel of said silica, suspending said xerogel as a slurry in a water miscible organic liquid, adding to said slurry an aqueous solution of chromic nitrate nonahydrate, evaporating liquid from said slurry, and heating to decompose said chromic nitrate nonahydrate.

6. A process according to claim 5 wherein said water miscible organic liquid is acetone.

7. A process according to claim 5 wherein the solvent of said aqueous solution is constituted by a major proportion of a water miscible organic liquid and at least 6% of water.

8. A process according to claim 7 wherein the organic liquid of said solvent is acetone.

9. A process for preparing a solution of chromic nitrate nonahydrate in a solvent constituted by a major proportion of a water miscible organic liquid and suitable for impregnation of a porous silica support which comprises wetting said chromic nitrate nonahydrate with a minor amount of water and adding to the wetted chromic nitrate nonahydrate a quantity of water miscible liquid greater than the water content of said wetted chromic nitrate nonahydrate.

10. A process according to claim 9 wherein said organic liquid is acetone.

11. A process for preparing a catalyst of chromium oxide supported on a silica gel of high pore volume which comprises forming a silica hydrogel, replacing the aqueous phase of said hydrogel by acetone to form an organogel, suspending said organogel as a slurry in acetone, adding to said slurry a solution of chromic nitrate nonahydrate in acetone which contains a minor amount of water, evaporating liquid from said slurry, and heating to decompose said chromic nitrate nonahydrate.

* * * * *